Figure 1:
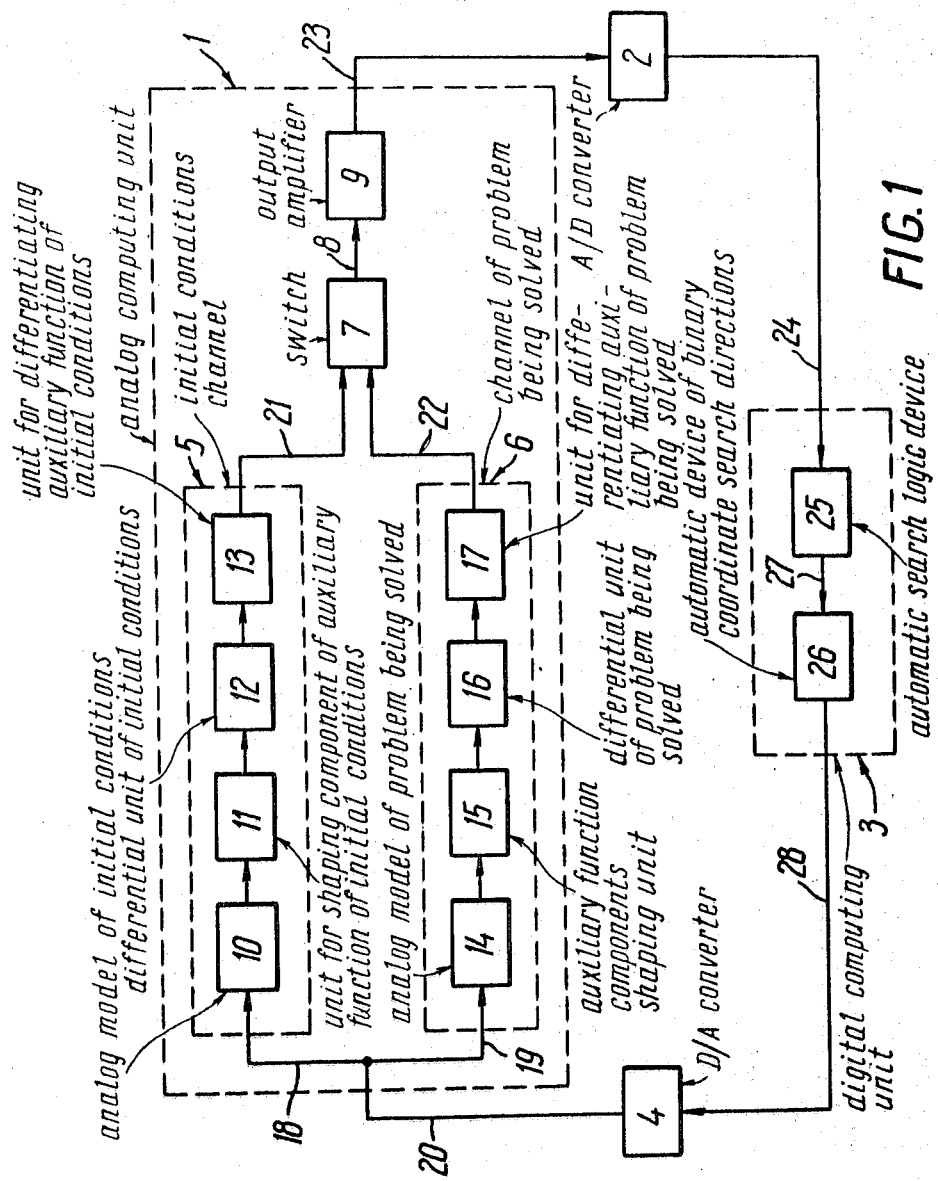

United States Patent

Grezdov et al.

[11] 3,840,725
[45] Oct. 8, 1974

[54] HYBRID COMPUTER TO SOLVE NONLINEAR PROGRAMMING PROBLEMS

[76] Inventors: Gennady Ivanovich Grezdov, ulitsa Filatova, 1/22, kv. 111; Kondrat Iosifovich Gischak, prospekt Nauki, 120, kv, 12; Jury Pavlovich Logvinenko, ulitsa Lysogorskogo, 23, kv. 2; Georgy Evgenievich Pukhov, prospekt Nauki; 111/2, kv. 64; Lilia Alexeevna Simak, prospekt 40 let Oktyahrya, 82, kv, 60; July Petrovich Kosmach, prospekt Nauki, 142/1 korpus 14, 13/7, all of Kiev, U.S.S.R.

[22] Filed: May 17, 1972

[21] Appl. No.: 254,315

[52] U.S. Cl............................. 235/150.5, 235/150.1
[51] Int. Cl.............................................. G06j 1/00
[58] Field of Search............ 235/150.5, 150.53, 180, 235/150.1; 444/1; 340/172.5

[56] References Cited
UNITED STATES PATENTS

| | | | |
|---|---|---|---|
| 3,443,074 | 5/1969 | Schmid | 235/150.5 X |
| 3,493,731 | 2/1970 | Lemonde | 235/150.5 |
| 3,532,861 | 10/1970 | Baumann et al. | 235/150.5 |
| 3,610,896 | 10/1971 | Heid | 235/150.5 |

Primary Examiner—Joseph F. Ruggiero
Attorney, Agent, or Firm—Waters, Roditi, Schwartz & Nissen

[57] ABSTRACT

A hybrid computer to solve nonlinear programming problems, in which and analog computing unit comprises: a channel of initial conditions producing, on the basis of signals proportional to current values of variables, and on the basis of preset signals proportional to required or desired values of the initial conditions, a signal representing a time derivative of an axuiliary function of the initial conditions; and a channel of the problem being solved which produces, on the basis of signals proportional to current values of variables and according to conditions of the problem introduced in an analog problem model, a signal representing a time derivative of an auxiliary function, the latter channels being connected to the input of an output amplifier via a switch. The computer is provided with analog-to-digital and digital-to-analog converters and with a digital computing unit. While finding the minima of the auxiliary functions to solve non-linear programming problems, the computer uses the descent method.

16 Claims, 16 Drawing Figures

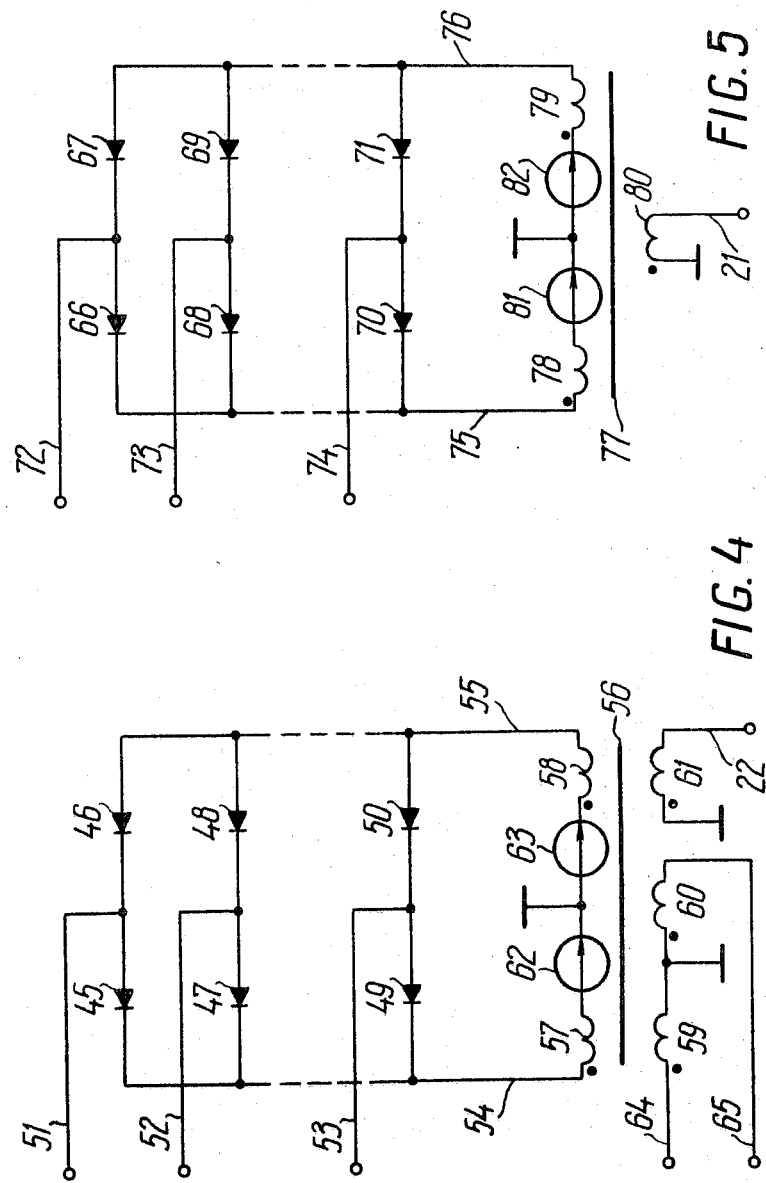

HYBRID COMPUTER TO SOLVE NONLINEAR PROGRAMMING PROBLEMS

The invention relates to computers and in particular to hybrid computers designed to solve nonlinear programming problems, which can be used to solve the following problems which represent versions of the general nonlinear programming problem, viz. finding the minimum or the maximum of a function of one or several variables, and solving systems of nonlinear algebraic or transcendental equations and/or inequalities. These problems can contain parameters that vary in time.

Known in the art is a hybrid digital-analog computer, the block diagram of which comprises an analog computing unit, an analog model of the problem conditions, a unit for shaping the auxiliary function, an analog-to-digital converter, a digital computing unit and a digital-to-analog converter. Following the initial information on the problem conditions having been fed into the analog model and into the digital computing unit, the computer performs analog and digital computations. In the course of solving the problem the results obtained in the analog computing unit are transferred to the digital computing unit while those obtained in the digital computing unit are transferred to the analog computing unit. The values obtained in the analog computing unit are converted from analog into digital form while those obtained in the digital computing unit are converted into the analog form, with the help of analog-to-digital and digital-to-analog converters.

This computer suffers from a number of drawbacks, the major ones being its complexity and high cost as well as difficulties in programming and data input. The analog and digital computing units are rather complex and expensive. Besides, the computer comprises also rather complex analog-to-digital and digital-to-analog converters.

The difficulties in programming and data input are caused by the requirement of feeding the data on the conditions of the problem to both the analog and the digital computing units simultaneously and by the requirement of programming the operation of both units.

The object of the present invention is to obviate the above drawbacks.

The invention is based upon the problem of designing a hybrid computer to solve nonlinear programming problems, characterized by simple procedures required to program the problem and to feed the computer with the data on the problem conditions.

This problem is solved by providing a hybrid computer to solve nonlinear programming problem comprising: an analog computing unit containing an analog model of the problem being solved, a unit for shaping the auxiliary function and a unit for shaping the derivative of the auxiliary function connected in series and producing, on the basis of signals proportional to the current values of variables and the conditions of the nonlinear programming problem present in the analog model of the problem being solved, a signal representing the time derivative of the auxiliary function, as well as an analog-to-digital converter, a digital computing unit and a digital-to-analog converter, which, to solve nonlinear programming problems, uses the descent method for finding minima of the auxiliary function and in which, according to the invention, the analog computing unit is provided with a channel of initial conditions and a channel of the problem being solved connected, via a switch, to the input of an output amplifier, the channel of initial conditions comprising: an analog model of initial conditions, a unit for shaping components of the auxiliary function of initial conditions, a differential unit of initial conditions and a unit for differentiating the auxiliary function of initial conditions, all connected in series, and producing, on the basis of signals proportional to the current values of variables and preset signals representing the required initial conditions, a signal proportional to the time derivative of the auxiliary function of initial conditions; and the channel of the problem being solved comprising: said analog model of the problem being solved, a unit for shaping components of the auxiliary function and a unit for the derivative, all connected in series, while the unit for shaping the derivative is made of a differential unit of the problem being solved and a unit for differentiating the auxiliary function of the problem being solved connected in series, the inputs of the two channels being interconnected and serving as the inputs of the analog computing unit, while the outputs of the two channels are connected to the inputs of a switch that connects the input of the output amplifier to the output of the channel of initial conditions in the initial conditions presetting mode and to the output of the channel of the probleb being solved in the solution finding mode, while the output of the output amplifier is connected, via the analog-to-digital converter comprising a zero-organ and generating a signal indicative of the sign of the time derivative of the respective auxiliary function, to the input of the digital computing unit which comprises an automatic search logic device and an automatic device of binary coordinate search directions connected in series and which, on the basis of a signal indicative of the sign of the time derivative of the respective auxiliary function, produces instructions to change search directions and the sign of advance in the course of search in the preset direction that appear at the outputs of the automatic search logic device as well as a series of binary coordinate search directions that appear at the outputs of the automatic device of binary coordinate search directions, these outputs serving as the outputs of the digital computing unit that are connected to the inputs of the analog computing unit via a digital-to-analog converter using integrators and generating a continuous search trajectory in accordance with said series of binary coordinate search directions in the form of signals proportional to current values of the variables which, at the end of the search procedure, assume the required initial conditions in the initial conditions presetting mode and the values of the roots of the nonlinear programming problem corresponding to the given initial conditions in the solution finding mode of operation.

The automatic search logic device may comprise: three coincidence circuits with one input of each receiving clock pulses while the second inputs of the first and of the third circuits are connected directly to the output of an analog-to-digital converter, the second input of the second coincidence circuit being connected to the output of said converter via an inverter, and a complementing flip-flop, the complementing input of which is connected to the output of the first coincidence circuit, the 0-state setting input is connected to the output of the second coincidence circuit, the 1- state output is connected to the third input of the third coincidence circuit the output of which serving as the output of the automatic search logic device produces an instruction to change the sign of advance in course of search in the present direction, while the O-state output of the flip-flop serves as the second output of the automatic search logic device which produces a signal indicating a change in the search direction.

The automatic device of binary coordinate search directions can comprise: an automatic direction indication sensor arranged around a ring counter having a number of states equal to that of unknown variables the complementing input of which is fed with an instruction to change the search direction, an automatic device of the sign of advance in the required direction arranged around a complementing flip-flop the complementing input of which receives an instruction to change the sign of advance in the required search direction, and a circuit for shaping binary coordinate search directions arranged as a decoder the input of which are connected to the outputs of said ring counter and said flip-flop while the outputs serve as the outputs of the automatic device of binary coordinate search directions.

To generate a time derivative of the auxiliary function described as $$\frac{d}{dt}\left(\eta\varphi_1 + \sum_{i=1}^{s} \sqrt{\varepsilon_i^2 + \beta^2}\right),$$

where $\varepsilon_i$ is the mismatch error in the conditions of the problem being solved, $\phi_1$ is the function the maximum and the minimum of which is being sought according to the conditions of the problem, $\eta$ is a constant which can assume the value of either +1 or −1 depending on what is being sought: the minimum or the maximum of the function $\phi_1$ $i$ is the limitation number, $s$ is the quantity of limitations, $\beta$ is a constant it is advisable that the unit generating components of the auxiliary function, the differential unit of the problem being solved and the unit for differentiating the auxiliary function of the problem being solved should be designed as a single circuit comprising: several diode networks everyone of which contains two diodes connected in series and in the same direction, the junction points between them serving as the inputs of the circuit, while diode networks are connected in parallel so that similar poles of all networks are combined to form cathode and anode adding assemblies respectively, a transformer with five windings and two sources generating equal voltages which determine the size of the auxiliary function square variation zone the start of the first winding being connected to the cathode adding assembly and its terminal, to the negative pole of the first voltage source, the start of the second winding being connected to the positive pole of the second voltage source while its terminal, to the anode adding assembly, the terminal of the third winding, the starts of the fourth and the fifth windings, the positive pole of the first voltage source and the negative pole of the second source being grounded, the start of the third winding and the terminal of the fourth one serving as the inputs of the circuit which receive signals corresponding to the value of the function whose maximum and minimum are being sought according to the conditions of the problem being solved, and the terminal of the fifth winding, the signal at which corresponds to the time derivative of the auxiliary function, serving as the output of the circuit.

To generate a time derivative of the auxiliary function of initial conditions described as $$\frac{d}{dt}\sum_{j=1}^{n}\left(\sqrt{\varepsilon_j^2 + \beta^2}\right),$$

where $\varepsilon_j$ is the mismatch error in initial conditions, $j$ is the initial condition number, $n$ is the quantity of initial conditions $\beta$ is a constant, it is convenient to combine the unit for generating components of the auxiliary function of initial conditions, the differential unit of initial conditions and the unit for differentiating the auxiliary function of initial conditions in a single circuit comprising: several diode networks everyone of which would contain two diodes connected in series and in the same direction, the junction points between them serving as the inputs of the circuit, while the networks are arranged in parallel so that similar poles of all networks are combined to form cathode and anode adding assemblies; a transformer with three windings and two sources generating equal voltages which determine the size of the auxiliary function square variation zone, the start of the first transformer winding being connected to the cathode adding assembly and the terminal, to the negative pole of the first voltage source, the start of the second winding being connected to the positive pole of the second voltage source and the terminal, to the anode adding assembly, the start of the third winding, the positive pole of the first voltage source and the negative pole of the second voltage source being grounded and the terminal of the third winding, the signal at which corresponds to the time derivative of the auxiliary function of initial conditions, serving as the output of the circuit.

The analog model of the problem being solved can be realized on the basis of a function generator of the function of one or several variables whose minimum or maximum is being sought according to the conditions of the problem, the output signal of the generator being presented as a current, while its inputs and outputs serve as the inputs and outputs respectively of the analog model of the problem being solved.

It is preferable that the analog model of the problem being solved should comprise function generators of functions of one or several variables forming a system of equations that describe the problem being solved, the outputs of the function generators being presented as currents and their inputs being combined to serve as the inputs of the analog model of the problem being solved, while the outputs of the function generators serve as the outputs of the analog model of the problem being solved.

The analog model of the problem being solved can comprise function generators of functions of one or several variables that make part of the system of equations describing the problem being solved, and inequality-to-equation converters connected to the function generators in series, their outputs being represented as currents, while the inputs of the function generators are combined to serve as the inputs of the analog model of the problem being solved and the outputs of the inequality-to-equation converters serve as the outputs of the analog model of the problem being solved.

The analog model of the problem being solved can comprise also: a passive computing unit having two groups of inputs and producing output values in the form of current; auxiliary function generators each having two groups of inputs and producing output values in the form of currents, and a unit of direct current DC amplifiers, while the first input groups of the passive computing unit and of the auxiliary function generators should be combined to serve as the inputs of the analog model of the problem being solved, the second input groups of the passive computing unit and of the auxiliary function generators should also be combined and connected to the outputs of the DC amplifier unit, the outputs of the auxiliary function generators should be connected to the inputs of the DC amplifier unit and the outputs of the passive computing unit should serve as the outputs of the analog model of the problem being solved.

Preferably, the passive computing unit can be arranged around a function generator of the function of one or several variables whose minimum or maximum is being sought according to the conditions of the problem being solved, the function generator having two groups of inputs and producing an output in the form of a current.

It is advisable that the passive computing unit should comprise function generators of functions of one or several variables that form a system of equations describing the problem being solved, every function generator being provided with two groups of inputs and producing outputs in the form of currents.

The passive computing unit can comprise: function generators of functions of one or several variables that make part of the system of equations describing the problem being solved, every function generator being provided with two groups of inputs, and inequality-to-equation converters connected to the function generators in series which produce outputs in the form of currents, the first input groups of the function generators being combined to serve as the first group of inputs of the passive computing unit, the second input group of the function generators being also combined to serve as the second group of inputs of the passive computing unit and the outputs of the inequality-to-equation converters serving as the outputs of the passive computing unit.

The proposed computer, although specialized, is designed to solve a rather broad range of problems including widely used nonlinear problems such as systems of nonlinear algebraic or transcendental equations and inequalities, the problems of finding unconditional minima or maxima of functions of one or several variables and various combinations of these problems as well as problems of nonlinear programming.

These problems are quite difficult to solve using available computer technology. Some of them can be solved with the help of analog computers but the procedure requires a complex machine due to which the solution is rendered inefficient. The use of a digital computer makes the solution of all the problems under discussion quite effective provided the approximate location of the roots being sought is known. Otherwide, the efficiency of solving them on a digital computer is drastically reduced. The use of both an analog and a digital computer to solve these problems is also not quite effective since it is rather difficult to program them and to input data into the analog machine. The broad field of applications of the problems under discussion makes it quite feasible to design a specialized computer to solve them.

All the problems mentioned above can be sucessfully solved using one and the same descent method which consists in that, according to the problem being solved, an auxiliary function is plotted within the space of variables that are being sought, the auxiliary functions having minima when the values of the unknown variables are equal to the roots, Then, the solution of the problem is brought down to finding the minima of the auxiliary function whose coordinates will give the roots being sought. There is quite a number of methods that could be used as the basis for the design of a hybrid computer, but the best of them however is the descent method according to which the mismatch errors in the problem conditions and the auxiliary function of these mismatch errors are being computed continuously depending upon the continuously changing unknown variables, while the changes of the variable effected in order to find the minima of the auxiliary function occur in accordance with the results of logical operations that are performed according to variations of the auxiliary function.

The descent method presumes that the mismatch errors between the initial conditions and the auxiliary function are calculated by analog means while the minima of the plotted auxiliary function are found by the digital computing unit and digital-to-analog and analog-to-digital converters which in the proposed system can be made quite simple while their purpose is different from that of converters by hydrid computing systems. Thus, the external characteristics of the hybrid computer are similar to those of analog machines but the computer itself is characterized by its ability to deal with a broad close of problems, by the simplicity of both the design and the problem solution procedure. Since the conditions of a problem are preset in the analog computing unit, the latter is made reprogrammable to enable the computer to switch over from one problem to another. Other units for the given machine can have a fixed design. On the outside the problem solution procedure looks like that solved by an ordinary analog computer; the problem diagram is set in the analog computing unit in accordance with the conditions of the problem while the roots of the problem are found by means of an automatic search procedure in the machine.

A hybrid computer designed along these lines ensures considerable technical advantages. The analog computing unit for solving comparatively complex mathematical problems can be designed without DC amplifiers. If, however, they are used in the analog computing unit the latter becomes much more flexible and preserves its stability. Thus, the analog computing unit itself becomes more simple while the data input procedure and the programming of the problem are facilitated.

The law chosen to construct the auxiliary function makes the hybrid computer highly sensitive to mismatch errors in the problem conditions allowing it to find the roots of the problem being solved with a comparatively high degree of accuracy.

The use of passive computing elements in the analog model of the problem being solved along with DC amplifiers as well as the possibility of providing a high-speed digital computing unit makes it possible to quickly change the unknown variables and, hence, to find the roots of the problem being solved with a high speed. A hybrid computer designed on the basis of the above principles is a simple and inexpensive computing device which is small in size and light in weight.

The invention will be better understood from the description of its possible embodiments given by way of example with reference to the accompanying drawings, in which FIG. 1 presents a block diagram of the hybrid computer to solve nonlinear programming problems, according to the invention.

Figure 2:
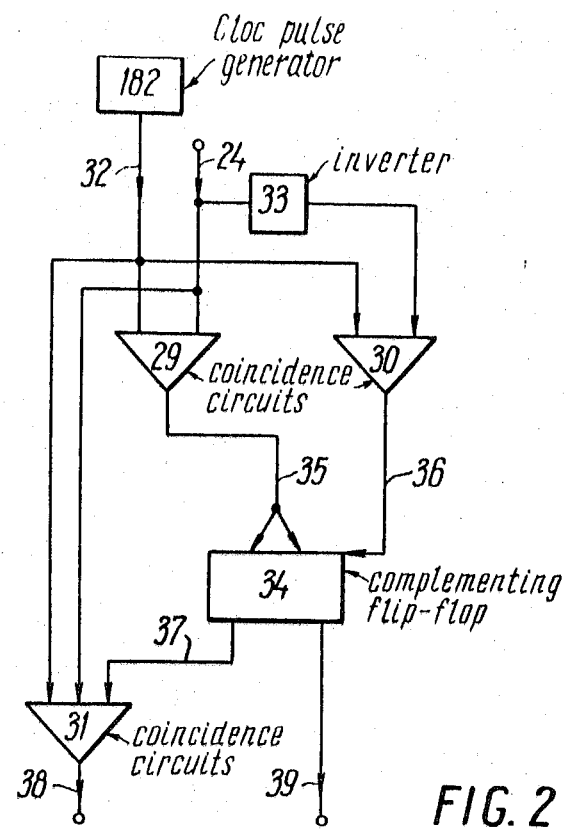
Figure 3:
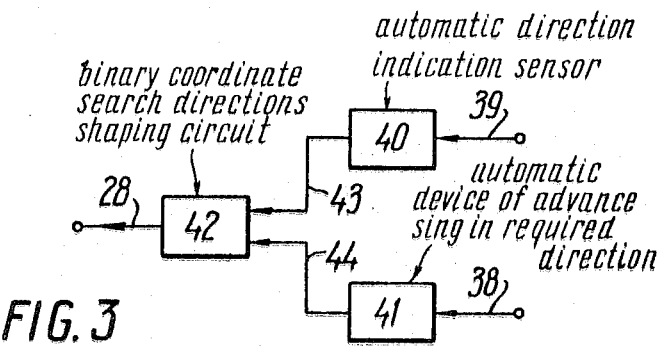

FIG. 2 is a block diagram of an automatic search logic device, according to the invention, FIG. 3 is a block diagram of an automatic device of binary coordinate search directions, according to the invention, FIG. 4 shows a schematic diagram of a unit for generating components of the auxiliary function, a differential unit of the problem being solved, and a unit for differentiating the auxiliary function of the problem being solved.

Figure 6:
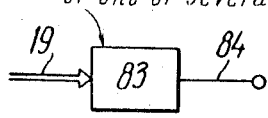
Figure 7:
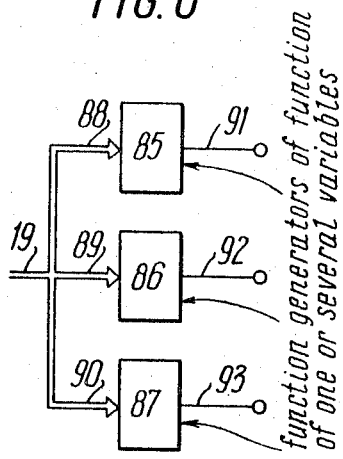
Figure 8:
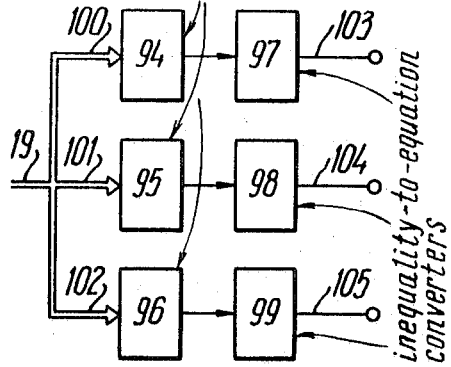
Figure 9:
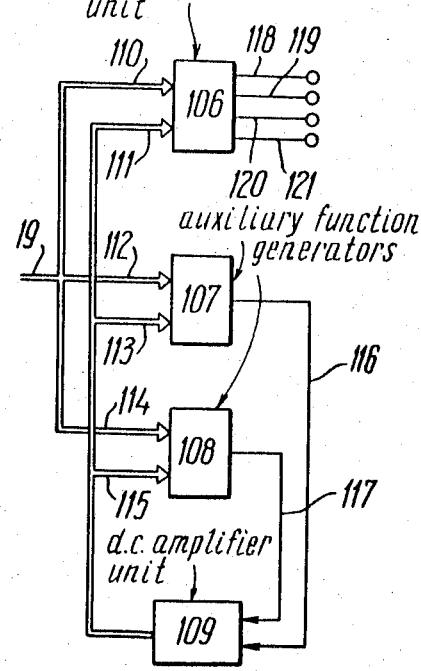
Figure 10:
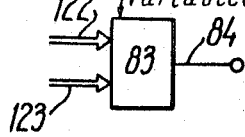
Figure 12:
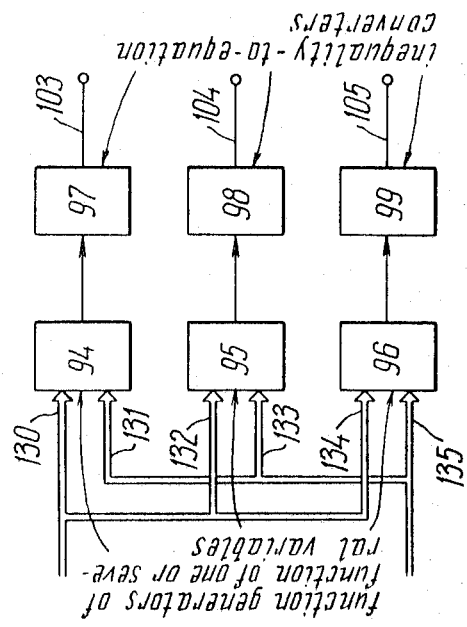
Figure 11:
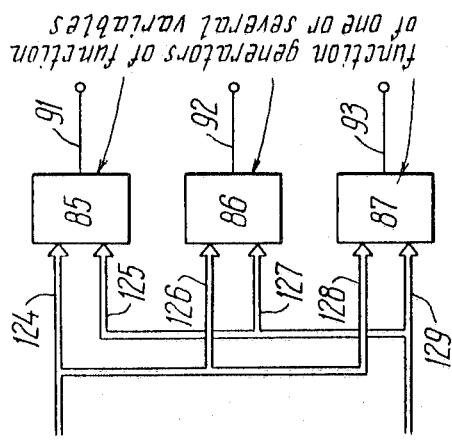
Figure 13:
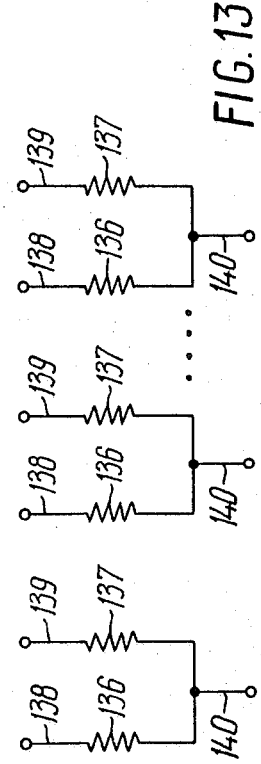
Figure 14:
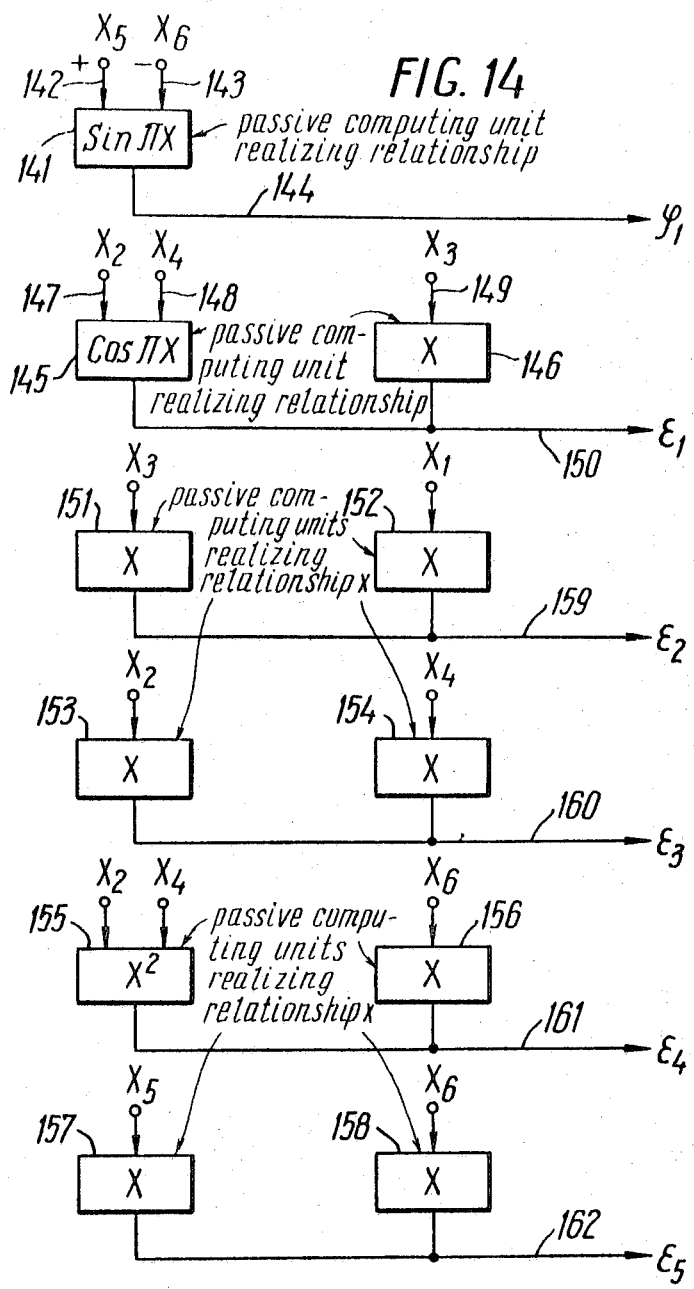
Figure 15:
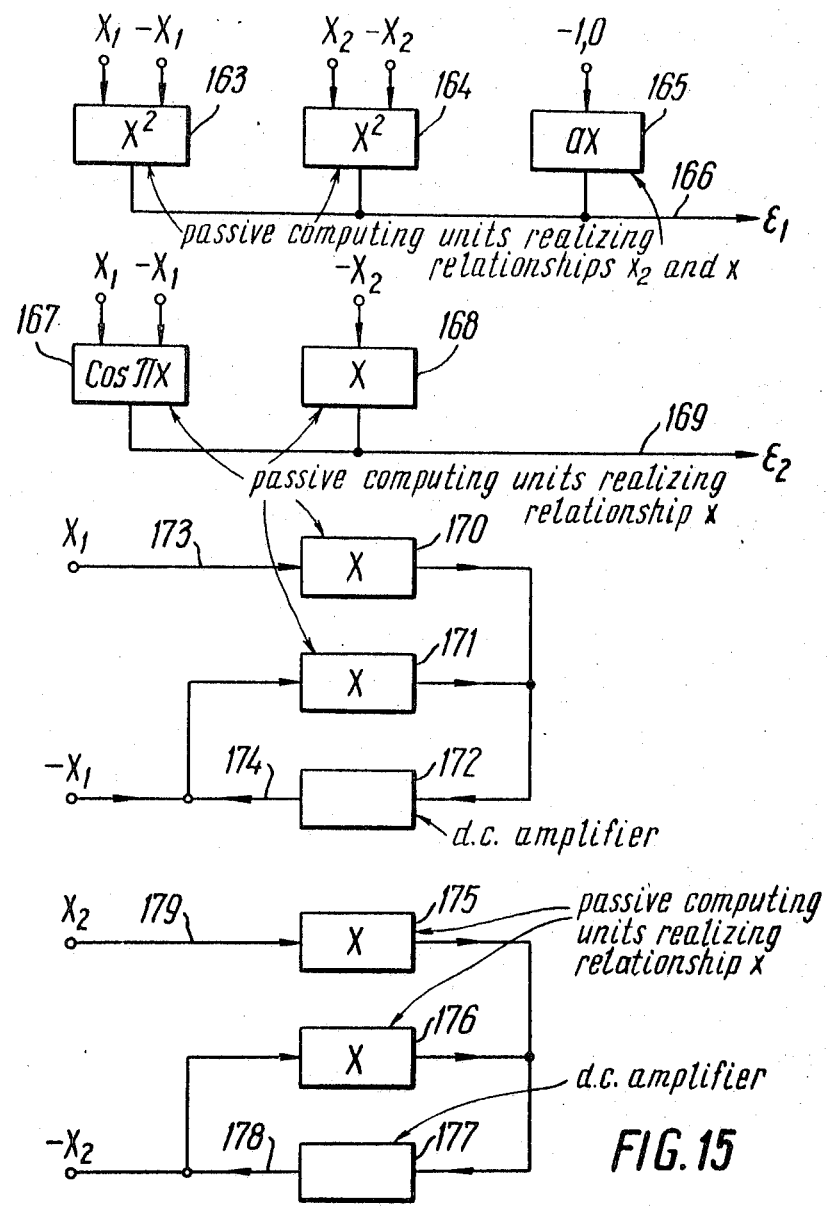
Figure 16:
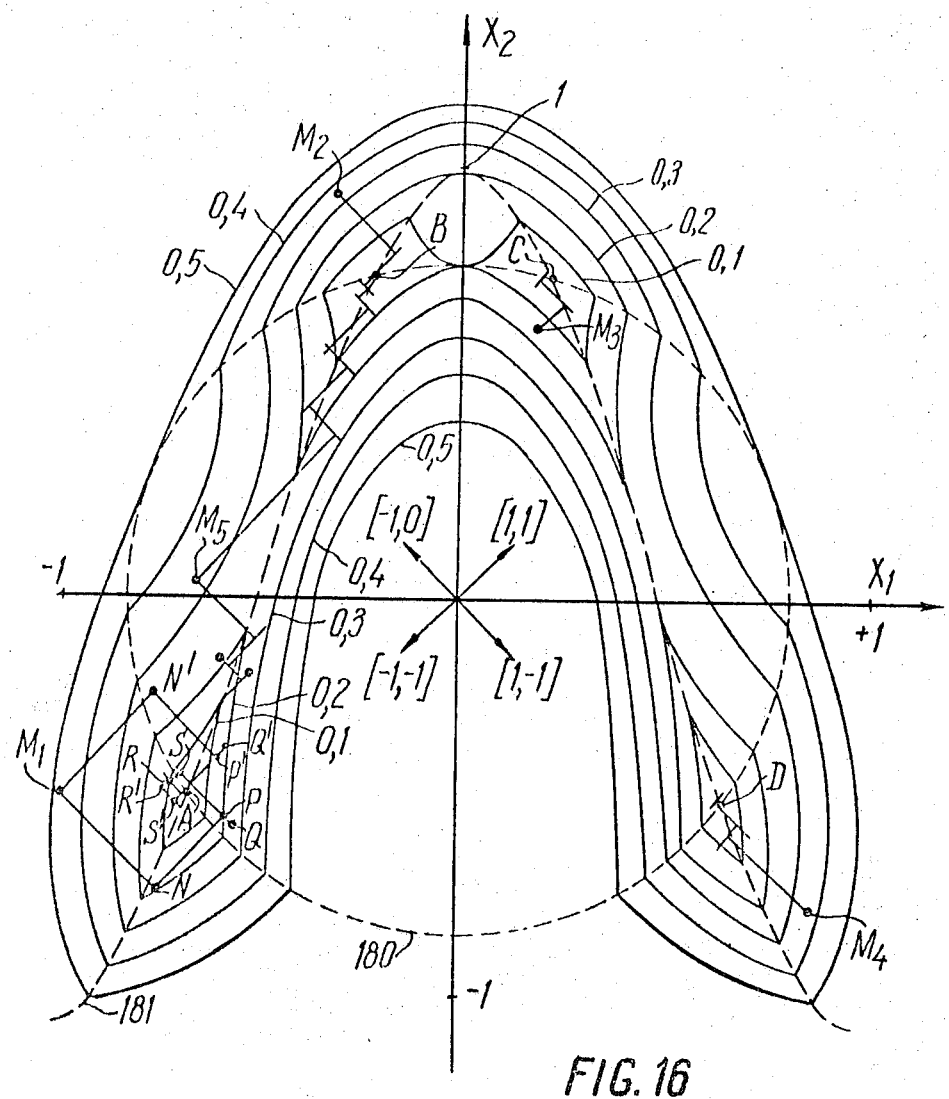

FIG. 5 is a schematic diagram of a unit for generating components of the auxiliary function of initial conditions, a differential unit of initial conditions, and a unit for differentiating the auxiliary function of initial conditions, according to the invention, FIG. 6 presents a block diagram of an analog model of the minimized or maximized function, according to the invention, FIG. 7 is a block diagram of an analog model of a system of equations, according to the invention, FIG. 8 is a block diagram of an analog model of a system of inequalities, according to the invention, FIG. 9 is a block diagram of an analog model of the problem being solved, according to the invention, FIG. 10 is a block diagram of a passive computing unit finding the minima or maxima of a function, according to the invention, FIG. 11 is a block diagram of a passive computing unit solving systems of equations, according to the invention, FIG. 12 is a block diagram of a passive computing unit solving systems of inequalities, according to the invention, FIG. 13 is a schematic diagram of an analog model of initial conditions, according to the invention, FIG. 14 is a block diagram of an analog model realizing the function $\phi_1 = \sin \pi (1/\pi \arccos X_1)^2$, according to the invention, FIG. 15 is a block diagram of an analog model realizing a particular system of equations, according to the inventions, and FIG. 16 is a plot of the auxiliary function corresponding to the particular system of equations.

FIG. 1 presents a block diagram of the proposed hybrid computer to solve nonlinear programming problems, which comprises an analog computing unit 1, an analog-to-digital converter 2, a digital computing unit 3 and a digital-to-analog converter 4.

The analog computing unit 1 is provided with a channel 5 of initial conditions and with a channel 6 of the problem being solved. The two channels, via a switch 7, are connected to an input 8 of an output amplifier 9.

The channel 5 of initial conditions comprises: an analog model 10 of initial conditions, a unit 11 for generating components of the auxiliary function of initial conditions, a differential unit 12 of initial conditions and a unit 13 for differentiating the auxiliary function of initial conditions, all connected in series.

On the basis of signals proportional to the current values of variables and preset signals proportional to the desired values of initial conditions the channel will produce, in the initial condition presetting mode, a signal proportional to the time derivative of the auxiliary function of the initial conditions.

The channel 6 of the problem being solved comprises: an analog model 14 of the problem being solved, a unit 15 for generating components of the auxiliary function, a differential unit 16 of the problem being solved and a unit 17 for differentiating the auxiliary function of the problem being solved. In the solution finding mode the channel 6 uses signals proportional to the current values of variables and the conditions of the nonlinear programming problem preset in the analog model 14 and produces a signal proportional to the time derivative of the auxiliary function.

Inputs 18 and 19 of the two channels 5 and 6 are combined to serve as inputs 20 of the analog computing unit 1, while outputs 21 and 22 of both channels 5 and 6 are connected to the inputs of the switch 7.

In the initial condition presetting mode the switch 7 connects the output of the channel 5 of initial conditions to the input 8 of the output amplifier 9.

In the solution finding mode the switch 7 connects the inputs 8 of the output amplifier to the output of the channel 6 of the problem being solved.

An output 23 of the output amplifier 9 is connected to an input 24 of the digital computing unit 3 via the analog-to-digital converter 2 which serves as a zero-organ and produces a signal indicative of the sign of the derivative of the respective auxiliary function.

The digital computing unit 3 comprises a search logic automatic device 25 and an automatic device 26 of binary coordinate search directions and, using a signal indicating the sign of the auxiliary function derivative, generates instructions to change the search direction and the sign of advance in the required search direction of outputs 27 of the automatic search logic device 25 as well as a series of binary coordinate search directions at outputs 28 of the automatic device 26 of binary coordinate search directions. The outputs 28 of the automatic device 26 serve as outputs of the digital computing unit 3 and are connected to the inputs 20 of the analog computing unit 1 via a digital-to-analog converter 2.

The digital-to-analog converter 2 uses integrators and shapes a continuous search trajectory according to the above mentioned series of binary coordinate search directions in the form of signals proportional to the current values in the initial condition presetting mode. In the solution finding mode it produces values of the roots of the nonlinear programming problem which correspond to preset initial values.

FIG. 2 presents a schematic diagram of a version of the automatic search logic device 25. As it is shown in the diagram of the automatic search logic device 25 comprises three coincidence circuits 29, 30, 31. One input 32 of every circuit is fed with clock pulses, the second inputs of the second 29 and of the third coincidence circuit 31, which serve as inputs 24 of the automatic device 25, are connected directly to the output of the analog-to-digital converter 2, while the second input of the second circuit 30 is connected to the coverter output via an inverter 33.

The automatic device comprises also a complementing flip-flop 34, a complementing input 35 of which is connected to the output of the first coincidence circuit 29, an O-state setting input 36 is connected to the output of the second coincidence circuit 30, while an I-state output 37 is connected to the third input of the third coincidence circuit 31, an output 38 of which serving as the output of the automatic search logic device 25 produces an instruction to change the sign of advance in the required direction. An O-state output 39 of the flip-flop 34 serves as the second output of the automatic search logic device 25 which produces the instruction to change the search direction.

FIG. 3 shows a block diagram of a version of the automatic device 26 of binary coordinate search directions. It comprises an automatic direction indication sensor 40 arranged around a ring counter the number of states of which is equal to that of unknown variables. From the output 39 of the flip-flop 34 the complementing input of the ring counter receives an instruction to change the search direction.

The device 26 comprises also an automatic device 41 of the sign of advance in the required direction arranged as a complementing flip-flop. From the output 38 of the coincidence circuit 31 the complementing input of the flip-flop receives an instruction to change the sign of advance in the preset direction.

Finally the automatic device 26 comprises a circuit 42 for shaping binary coordinate search directions arranged as a decoder, inputs 43 and 44 of which are connected to the outputs of the automatic device 40 and 41 and the outputs of which serve as outputs of the automatic device 26 of binary coordinate search directions.

FIG. 4 presents a schematic diagram of the circuit for generating a time derivative of the auxiliary function according to the mismatch errors in the problem conditions. The diagram illustrates a version of the procedure for shaping a variable of the auxiliary function described as $$\frac{d}{dt}\left(\eta\varphi_1+\sum_{i=1}^{s}\sqrt{\varepsilon_i^2+\beta^2}\right),$$

where $\eta$ is a constant which can assume the value of either +1 or −1 depending upon that is being sought: the minimum or the maximum of the function $\eta_1$, $\varepsilon_i$ is the mismatch error in the conditions of the problem, $\phi_1$ is the function of maximum or the minimum of which is being sought according to the conditions of the problem, $i$ is the limitation number, $s$ is the quantity of limitations $\beta$ is a constant.

The single circuit of FIG. 4 performs the operations of the unit 15 for shaping components of the auxiliary function, of the differential unit 16 of the problem being solved and of the unit 17 for differentiating the auxiliary function of the problem being solved. The circuit contains several diode networks everyone of which comprises two diodes 45 and 46, 47 and 48, 49 and 50 connected in series and in the same direction. The function points of the diodes serve as inputs 51, 52 and 53 of the circuit, the diode networks being connected in parallel. Similar poles of all networks are combined to form a cathode 54 and an anode 55 adding assemblies respectively.

The circuit comprises also a transformer 56 having five windings 57, 58, 59, 60 and 61. The start of the first winding 57 and the terminal of the second winding 58 are connected to the cathode adding assembly 54 and to the anode adding assembly 55 of said diode networks respectively.

The terminal of the first winding 57 and the start of the second winding 58 are connected to the negative and to the positive poles of voltage sources 62 and 63 respectively, the sources producing equal voltages and determining the size of the zone of auxiliary function square variations.

The second poles of the sources 62 and 63, as well as the terminal of the third winding 59 and the starts of the fourth 60 and the fifth 61 windings of the transformer 56 are grounded. The start of the third winding 59 and the terminal of the fourth winding 60 of the transformer serve also as inputs 64 and 65 of the circuit which are fed with signals corresponding to the value of the function whose maximum or minimum is being sought according to the conditions of the problem while the terminal of the fifth winding 61 the signal at which corresponds to a time derivative of the auxiliary function serves as the output 22 of the circuit.

FIG. 5 presents a schematic diagram of units generating the time derivative of the auxiliary function of initial conditions according to mismatch errors in the initial conditions. The schematic diagram illustrates a version of the procedure of shaping a variable of the auxiliary functions described as $$\frac{d}{dt}\left(\sum_{j=1}^{n}\sqrt{\varepsilon_j^2+\beta^2}\right),$$

where $\varepsilon_j$ is the mismatch errors in the initial condition $j$ is the initial condition number, $n$ is the quantity of initial conditions, $\beta$ is a constant in the formula of the law according to which the auxiliary function is formed.

The circuit simultaneously performs the operations of the unit II for generating components of the auxiliary function of initial conditions, of the differential unit 12 of initial conditions and of unit 13 for differentiating the auxiliary function of initial conditions. It contains several diode networks everyone of which comprises two diodes 66 and 67, 68 and 69, 70 and 71 connected in series and in the same direction. The junction points of the diodes serve as inputs 72, 73 and 74 of the circuit. The networks are connected in parallel so that similar poles of all networks are combined to form a cathode 75 and an anode 76 adding assemblies respectively.

The circuit comprises also a transformer 77 having three windings 78, 79 and 80. The start of the first windings 78 and the terminal of the second winding 79 are connected to the cathode adding assembly 75 and to the anode adding assembly 76 of the diode networks respectively.

The terminal of the first winding 78 and the start of the second winding 79 are connected to the negative and positive poles of voltage sources 81 and 82 respectively, the sources producing equal voltages and determining the size of the zone of auxiliary function square variations.

The second poles of the sources and the start of the third winding 80 of the transformer 77 are gounded. The terminal of the third winding 80 the signal at which corresponds to a time derivative of the auxiliary function of initial conditions serves as the output 21 of the circuit.

The analog model 14 (FIG. 1) of the problem being solved can comprise a function generator 83 (FIG. 3) of the function of one or several variables whose minimum or maximum is being sought according to the conditions of the problem. The output of the model is presented in the form of a current. The inputs of the function generator 83 serve as the inputs 19 of the analog model 14 (FIG. 1) while the output of the generator 83 (FIG. 6) serves as an output 84 of the analog model 14 (FIG. 1) and is connected to the input 64 (FIG. 4) when the minimum is being sought, or to the input 65 when the maximum of the function is being sought.

The analog model 14 (FIG. 1) of the problem being solved which is presented as a system of nonlinear algebraic equations can comprise function generators 85, 86 and 87 (FIG. 7) of functions of one or several variables that form said system.

Inputs 88, 89 and 90 of the generators 85 through 87 are combined to serve as the inputs 19 (FIG. 1) of the analog model of the problem being solved. Outputs 91, 92 and 93 (FIG. 7) of the generators 85 through 87 serve as the outputs of the analog model 14 (FIG. 1) of the problem being solved. They are connected to the inputs 51, 52 and 53 (FIG. 4). The outputs of the generators 85 through 87 (FIG. 7) are presented in the form of currents.

To find the values of variables that would satisfy a system of inequalities the analog model 14 (FIG. 1) of the problem being solved can comprise function generators 94, 95 and 96 (FIG. 8) of the functions of one or several variables forming the system of inequalities, as well as inequality-to-equation converters 97, 98 and 99, everyone of the converters being connected in series to the respective function generator (94 through 96).

Inputs 100, 101 and 102 of the function generators 94 through 96 are combined to serve as the input 19 of the analog model of the problem being solved while outputs 103, 104 and 105 of the converters 97 through 99 serve as the outputs of the analog model of the problem being solved and are connected to the inputs 51 through 53 (FIG. 4).

The analog model of the problem being solved can also have other designs using direct current operational amplifiers. FIG. 9 shows a block diagram of such a model which comprises a passive computing unit 106, auxiliary function generators 107 and 108 and a direct current amplifier unit 109. The unit 106 is provided with two groups of inputs 110 and 111. Similarly, each of the generators 107 and 108 is also provided with two groups of inputs 112 and 113, 114 and 115. The first input groups 110, 112, 114 are combined to serve as the inputs 19 of the analog model, while the inputs 111, 113 and 115 are also combined and connected to the outputs of the amplifier unit 109. Outputs 116 and 117 of the function generators 107 and 108 are connected to the inputs of the amplifier unit 109, while outputs 118, 119, 120 and 121 of the unit 106 serving as the outputs of the analog model are connected to the inputs 64 or 65 and to the inputs 51, 52 and 53 (FIG. 4).

In case the analog model of FIGS. 6, 7 and 8 of the problems discussed above use DC amplifiers, block diagrams of the passive computing unit of the analog model for all said problems will be similar to those of the analog model of these problems designed without DC amplifiers, the only difference pertaining only to the input networks. The block diagram of the passive computing unit shown in FIG. 10 corresponds to that of the analog model as shown in FIG. 6 and is provided with two groups of inputs 122 and 123 (FIG. 10).

The block diagram of the passive computing unit shown in FIG. 11 corresponds to that of the analog model as shown in FIG. 7 in which everyone of the function generators 85 through 87 (FIG. 11) is provided with two groups of inputs 124 and 125, 126 and 127, 128 and 129. The first input groups 124, 126 and 128 and the second input groups 125, 127, 129 are interconnected.

The block diagram of the passive computing unit shown in FIG. 12 corresponds to that of the analog model as shown in FIG. 8. Everyone of the function generators 94 through 96 (FIG. 12) in the passive computing unit is provided with two groups of inputs 130 and 131, 132 and 133, 134 and 135. The first input groups 130, 132, 134 and the second input groups 131, 133, 135 of the generators 94 through 96 are interconnected.

Each of the three problem types mentioned above can be realized by means of any of the two methods, i.e., with the use of DC amplifiers or without them. In case the conditions of the problem being solved simultaneously contain combinations of these problems, each of them can be realized by means of any of the methods.

Consider the operation of the proposed hybrid computer. The problem to be solved on the computer can in general be described as $$\Phi(t) = \min_{x_1,..., x_n} \phi_1(t, x_1,..., X_n),$$
$$\phi_{21}(t, x,..., X_n) = 0,$$
$$\phi_{2m}(t, x_1, ..., x_n) = 0,$$
$$B_1 \leq \phi_{31}(t, x_1,..., x_n) \leq a_1,$$
$$B_q \leq \phi_{3q}(t, x_1,..., x_n) \leq a_q,$$

where:

$x_1,..., x_n$ are the variables $n$ is the quantity of the variables being sought, $m$ is the number of equations in the system, $q$ is the number of inequalities in the system, $a, b$ are boundaries of the inequalities $\phi_1, \phi_{21},..., \phi_{2m}, \phi_{3,000}, \phi_q$ are the preset nonlinear functions of several variables, $\Phi(t)$ is an unknown time function.

Depending upon the particular type of conditions the problem under consideration can require the finding the roots of systems of either nonlinear algebraic or transcendental equations in which their turn describe a problem envolving the finding of real and complex roots of polynoms, the solution of nonlinear algebraic equation systems, the finding of eigenvectors and matrix units, conversion of coordinates and many other problems, the solution of non-linear inequality systems, the finding of the coordinates and the value of the unconditional minimum or maximum of a function of several variables and the solution of other nonlinear programming problems. The above problems may comprise both constant and varying in time parameters.

All these problems can be solved by means of the same descent method which consists in that, in accordance with the conditions of the problem, an auxiliary function is constructed within the zone of variables being sought, the function having minima when the values of the varialbles being sought are equal to the roots of the problem being solved. Then, the solution of the problem amounts to the finding of the minima of the auxiliary functions whose coordinates will give the roots being sougnt.

Generally a nonlinear problem would have several solutions. Such problem are described with the help of an auxiliary function having several minima. When finding the minima of such an auxiliary function the coordinates of the minima obtained at the end of the descent procedure will be determined by the initial point from which the descent has started. By presetting various initial points of the search procedure it it possible to find various minima of the auxiliary function and, hence, to obtain various solutions of the given problem.

To ensure the descent from various initial points the analog computing unit is designed to comprise two channels; a channel of initial conditions and a channel of the problem being solved. When presetting initial conditions it is necessary to construct an auxiliary function of the initial conditions having a single minimum which is determined by the preset required initial point position.

The solution finding mode is based upon the use of the auxiliary function of the problem being solved. When the computer passes over from the initial condition presetting mode to the solution finding mode the auxiliary function will undergo a sharp change: the auxiliary function of initial conditions becomes the auxiliary function of the problem being solved, which ensures that the search of the auxiliary function minimum starts from the preset initial position.

The channel of initial conditions in the analog model of initial conditions is used to compute, according to the required initial value preset by the operator and to the real value of the unknown variable, the mismatch error in the initial conditions in the form of a current proportional to the difference between the preset required value and the real current value of the unknown variable.

Currents proportional to mismatch errors for every variable can be obtained in an analog model of initial conditions arranged as a set of circuits (FIG. 13) everyone of which contains two equal resistors 136 and 137 connected in series. Applied to terminals 138 and 139 of the resistors are voltages proportional to the initial value and to the value of the unknown variable. The current proportional to the difference between these two values is picked off a mid-tap 140 of the resistor junction. The currents proportional to said mismatch errors are used to construct the auxiliary function of initial conditions in the unit II (FIG. 1) for shaping components of the auxiliary function of initial conditions.

The function conversion procedure according to the required law for constructing the auxiliary function of initial conditions is instrumented through the design of the unit II.

The differential unit 12 of initial conditions uses components of the auxiliary function to find the auxiliary function of initial conditions itself as the difference between the components. The output of the channel 5 of initial conditions is a signal proportional to a time derivative of the auxilary function which is produced by the unit 13 by means of differentiating a signal fed to its input which is proportional to the auxiliary function of initial conditions.

When, in the course of operation of the whole of the hybrid computer in the initial conditions presetting mode, the minimum of the auxiliary function of initial conditions is found, it will become evident that all the mismatch errors in the initial conditions are zero, i.e., the required values of unknown variables are equal to the real ones, or the preset initial point is found.

The channel 6 of the problem being solved is similar to the channel 5 of initial conditions: first, the analog model 14 of the problem being solved shaped currents proportional to the mismatch errors in the problem conditions, then, the values of these currents are used to construct components of the auxiliary function and the difference between the components gives the auxiliary function itself and finally, the auxiliary function is used to find its time variable. However, the design of units that go to form the channel 6 of the problem being solved is different from that of units of the channel 5 of initial conditions.

Nonlinear functions of several variables used to describe the conditions of problem are usually presented as mathematical formulae written with the help of common mathematical symbols. Such functions require formulae of different complexity. Functions that can be presented with the use of a single mathematical symbol belog to the class of elementary functions. Usually mathematical formulae are written with the help of a limited number of elementary function types. Hence, it becomes possible to mechanize the analog model of the problem being solved with the use of a small number of types of basic computing assemblies which, when connected in different ways, allow to construct complex functions described by mathematical formulae.

The required function can be mechanized in the analog model 14 in two ways: either with the use of only passive computing units or with the concurrent use of DC amplifiers. In fact passive computing units can be used to design the analog model 14 of the problem being solved for almost all functions to be found in practice. However, DC amplifiers used to mechanize complex functions simplify the design of the analog model. DC amplifiers make it possible to simplify such operations as function superposition, construction of certain reverse functions, inversion, etc., required to instrument mathematical formulae with the help of analog devices.

FIG. 9 shown the block diagram of an analog model of the problem being solved which contains both passive computing units and DC amplifiers. The final value of the function described by a mathematical formulae is obtained at the output of the basic passive computing unit 106 while auxiliary operations, such as superposition of functions, construction of reverse functions, inversion, etc., are performed by the auxiliary function generators 107 and 108 which operate the conjunction with the DC amplifier unit 109.

A change of the type of the problem being solved brings about considerable changes in the structure of the analog model.

To solve problems envolving the finding of the minima and the maxima of a function of several unlimited variables the analog model should be arranged as shown in FIG. 6. In case most simple case when the function to be minimized can be directly realized with the help of passive computing units the analog model will be presented as a passive function generator 83 (FIG. 6) of the given function of several variables.

When its inputs are fed with voltages varying in proportion to the unknown variables the output current of the generator will be proportional to the preset function calculated for current values of the unknown variables which have been fed to the inputs of this function generator 83.

The current obtained in this way is used then in the unit 15 for shaping components of the auxiliary function. It arrives either to the minimization input 64 or to the maximization input 65 of this unit. It should be noted that when solving problems of this type the analog model of the problem being solved can always be designed without the use of DC amplifiers.

But then there can be cases when it is necessary to convert the problem, after which the latter becomes that of finding the minimum of the converted function with limitation in the form of a system of equations.

This is illustrated by the following example. Suppose it is necessary to construct an analog model using only passive computing units which would correspond to the following function to be minimized.

$$\min \phi_1 = \sin \pi (1/\pi \overset{\wedge}{\text{arccos}} X_1)^2,$$

where the function of $\overset{\wedge}{\text{arccos}} X_1$ corresponds to the function of arccos $X_1$ taken within the space of its values from $-1$ and $+1$.

Suppose there are passive computing units fed with values in the form of voltages and producing outputs in the form of currents which represent $$X; \sin \pi X; \cos \pi X; X^2.$$

Units realising relationships such as $\sin \pi x$, $\cos \pi x$ and $x^2$ require that their inputs should be fed not only with the respective variabe, but also with its inverted value.

In order to use this set of elements to construct an analog model of a reduced function it is necessary to perform a number of conversions.

Since the function of $1/\pi \overset{\wedge}{\text{arccos}} x_1$ is the reverse of the function of $\cos \pi x$ it can be realized by means of introducing another variable with the help of an auxiliary equation.

$$\cos \pi x_2 - x_1 = 0,$$

from which $$x_2 = 1/\pi \overset{\wedge}{\text{arccos}} x_1.$$

But this equation uses the function of $-x$ to realize which it is also necessary to introduce another variable with the help of the second auxiliary equation $$x_3 + x_1 = 0$$

from which $$x_3 = -x_1$$

The first auxiliary equation is converted into $$\cos \pi x_2 + x_3 = 0$$

To realize the relationship of $\cos \pi x_2$ it is necessary to obtain the inverted value of the variable $x_2$, which can be done by introducing a variable $x_4$ with the help of the third auxiliary equation $$x_2 + x_4 = 0$$

from which $$x_4 = -x_2$$

Now, taking the above substitutions into account, the function $\phi_1$ can be written as $$\phi_1 = \sin \pi (x_2)^2,$$

i.e., it contains the superposition of two functions.

Introduce another variable $x_5$ with the help of the fourth auxiliary equation $$(x_2)^2 = x_5 = 0,$$

from which $$(x_5 = (x_2)^2$$

To realize the relationship $-x_5$ it is necessary to introduce another variable $x_6$ with the help of the fifth auxiliary equation $$x_5 + x_6 = 0$$

from which $$x_6 = -x_5$$

Hence, the fourth auxiliary equation can be converted into $$(x_2)^2 + x_6 = 0$$

Now, taking these conversions into account, the function of $\phi_1$ can be written as $$\phi_1 = \sin \pi x_5$$

and realized with the use of the passive auxiliary unit ($\sin \pi x$).

Passive computing units can be used to realize also all the five auxiliary equations that have been introduced.

Finally after the conversions the initial problem will be described as $$\sin Kx_5 \to \min$$

$$x_1 \ldots\ldots x_5$$

$$\cos\phi\, x_2 + x_3 = 0$$

$$x_3 + x_1 = 0$$

$$x_2 + x_4 = 0$$

$$(x_2)^2 + x_6 = 0$$

$$x_5 + x_6 = 0$$

and represented by the analog model shown in FIG. 14. The analog model contains a passive computing unit 141 realizing the relationship $\sin \pi x$. Inputs 142 and 143 of the unit are fed with the variables $x_5$ and $x_6$ respectively, while an output 144 produces the value of $\phi_1$ corresponding to current values of the input variables.

Passive computing units 145 and 146 whose inputs 147, 148 and 149 receive variables $x_2$, $x_3$ and $x_4$ respectively realize the first auxiliary equation. The current value of the mismatch error $\epsilon_i$ depending on the values of the input variables is produced at an output 150.

Passive computing units 151 and 152, 153 and 154, 155 and 156, 157 and 158 realize the second through the fifth auxiliary equations. The inputs of these units are fed with the variables from $x_1$ and $x_6$ in the order shown in FIG. 14 while outputs 159, 160, 161 and 162 shape the current values of errors in the respective equations depending upon the values of input variables.

In case the function to be minimized or maximized is to be mechanized with the use of DC amplifiers the procedure of function construction will consists of several parts. The value of the function to be minimized and maximized is shaped in the function generator 83 (FIG. 10) comprising passive computing units, while auxiliary operations are performed with the use of a group of auxiliary function generators 107, 108 and 109 (FIG. 9) operating in conjunction with DC amplifiers. The function generators 83 and 107 through 109 have two groups of inputs one of which (122, 112 and 114) are fed with voltages proportional to unknown variables, while the second group of inputs (123, 113 and 119) are fed with output voltages from DC amplifiers. Due to this arrangement the results of auxiliary operations can be used in the function generator 83 to construct the function to be minimized or maximized.

The structure of an analog model of a system of nonlinear algebraic or transcendental equations is shown in FIG. 7 in which every function included in the conditions of the problem can be directly mechanized in passive computing units. The inputs 88, 89 and 90 of the function generators 85, 86 and 87 the number of which corresponds to the number of equations in the system to be solved are fed with voltages proportional to current values of the unknown variables. Output currents of the function generators 85, 86, 87 are proportional to the values of functions of the current values of unknown variables fed to their inputs, i.e., they are equal to the current values of errors in every equation of the system.

When solving problems of this type with the use of an analog model without DC amplifiers there may be cased where it will be necessary to transform the problem, the result being that another system of equations is obtained which includes a great number of unknown variables and equations.

If a unit 109 and DC amplifiers (FIG. 11) is used to design an analog model the shaping of functions included in the system of equations will be performed in steps. The unknown values of functions are obtained with the help of the principal function generators 85, 86 and 87, while the auxiliary operations are performed with the help of the auxiliary function generators 107 and 108 (FIG. 9) and the unit 109 of DC amplifiers. These elements of the analog model te interconnected as shown in FIG. 9.

The structure of an analog model of a system of nonlinear algebraic or transcendental inequalities is shown in FIG. 8 for the case when every function included in the conditions of the problem can be directly realized with the use of passive computing units. The function generators 94, 95 and 96 are used to shape current values of the functions forming the system of inequalities which depend on current values of unknown variables presented as voltages that are applied to the inputs 100, 101 and 102.

The outputs produced by these function generators 94, 95 and 96 are presented as currents. A set of inequalitiy-to-equation converters 97, 98 and 99 is designed to determine the mismatch errors in the inequalities which are shaped as follows: the error will be zero if the inequality is satisfied irrespective of the function value in the inequalitiy; the error will be equal to the difference between the function in the inequality and the respective boundary of the inequality if the inequality is disturbed.

The operation of an inequality-to-equation converter is described as $$\epsilon_i = \min(0, \phi_{3i} - b_i) + \max(0, \phi_{3i} - a_i),$$

where $\epsilon_i$ is the error in the inequality,
$\phi_{3i}$ is the values of the preset nonlinear functions,
$a_i$ and $b_i$ are the boundaries of the inequalities,
$i$ is the inequality number.

Currents proportional to the mismatch errors in the inequalities and produced by the inequality-to-equation converters 97, 98 and 99 according to the values of functions in the inequalities and to the boundaries of the inequalities are fed to the unit 15 for shaping components of the auxiliary function where they are used just as mismatch errors in equations in the process of solving systems of equations. The inequality-to-equation converter performs a typical nonlinear operation called "the dead zone."

In case the functions that go to form the conditions of a problem can not be realized directly with the help of passive computing units the structure of the analog model will be changed.

Now, if the analog model is preferred to be constructed without DC amplifiers it will be necessary to simplify the functions by means of introducing auxiliary unknown variables and equations. It results in solving a system of inequalities together with a system of equations. In case it is decided to use DC amplifiers in the analog model the functions in the inequalities and the mismatch errors are calculated in a device prestented in FIG. 12 while the auxiliary operations are performed by auxiliary function generators 107 and 108 (FIG. 9) operating in conjunction with DC amplifiers.

The two parts of the analog model that have been discussed are used as shown in FIG. 9 where the functions of the passive computing unit 106 are performed by a group of function generators 94, 95 and 96 and inequality-to-equation converters 97, 98 and 99 connected as shown in FIG. 12.

The analog model structures considered above pertain to individual problems such as the finding of the minimum of a function, the solution of a system of equations or inequalities. To construct analog models of complex problems, e.g., compatible systems of equations or inequalities, the finding of minima and maxima of functions of several variables with limitation in the form of systems of equations and/or inequalities, it is necessary to arrange the above analog models of problem parts into a single common analog model. The interconnections between individual models should correspond to the conditions of the problem that is to be solved.

Thus, while constructing an analog model for minimizing a function with limitations in the form of a system of equations it is necessary to construct an analog model which would comprise the analog model for the function to be minimized (FIG. 6), and the analog model of the system of equations (FIG. 7) and in which the outputs of the first model would be connected to the minimization input 64 and the outputs of the second model to the inputs 51, 52 and 53 of the unit 15 for shaping components of the auxiliary function.

An auxiliary function for a nonlinear programming problem, consisting in minimizing or maximizing the function of one or several variables with limitations in the form of a system of equations and/or inequalities, is expressed as a sum of the function to be minimized or of its negative value and the sum of similar functions of one variable, the arguments of the latter functions being presented in the form of mismatch errors in the equations of the system of equations and in the inequalities in the system of inequalities. This auxiliary function can be written as follows, $$U = \eta \varphi_1 + \sum_{i=1}^{m} V(\varphi_{2i}) + \sum_{i=1}^{q} V(\mathcal{E}_{3i}),$$

where $\eta$ is a constant equal to either +1 or −1 depending on what is being sought: the minimum or the maximum of the function $\phi_1$, U is the auxiliary function, V is the selected single-type mismatch error conversion in the equations for $\phi_{2i}$ and in the inequalities for $\epsilon_{3i}$, m is the number of equations, q is the number of inequalities.

The auxiliary function consists of three parts which correspond to the three parts of the problem being solved: the first addend corresponds to the function being minimized or maximized, the second addend corresponds to a system of nonlinear algebraic or transcendental equations and the third addend corresponds to a system of nonlinear algebraic or transcendental inequalities.

If the problem being solved has a certain particular form the auxiliary function will comprise respective parts while the rest of the addends will be zero. For instance, in a problem involving the finding of the minimum of a function without limitations the second and the third addends will be zero.

The auxiliary function should satisfy the requirements of the descent method: it should be positively definite and have minima in these points where mismatch errors in the problem conditions are zero, besides it should have a continuous mismatch error derivative in the total zero of mismatch error variations.

It is also quite desirable that this function should be realized with the use of analog means in a simple way. Since the auxiliary function is represented as a sum of similar functions it would satisfy all the above requirements if they are satisfied by the function V.

The computer performs a transformation of $$V = \sqrt{\epsilon_i^2 + \beta^2},$$

where $\epsilon_i$ is the mismatch errors, $\beta$ is the transformation parameter allowing to vary the transformation curve, When mismatch errors $\epsilon_i$ are of considerable values, i.e., when $|\epsilon_i| > 2\beta$ the transformation of V will be characterized by a linear variation law and will approach the function of "modulus" $\epsilon_i$. In case the mismatch errors $|\epsilon_i| < \beta$ the transformation of V will be characterized by a square variation law (the straight brackets here are used to denote the modulus).

The function of V is particular in that both positive and negative values of its argument are required to construct it in the conventional way by using analog means. It means that every mismatch error in the problem being solved requires the use of inverters. It makes the whole of the computer quite complex.

The inverters for every mismatch error can however be eliminated if the function of V is constructed in the following way: the function is divided into two components in the form of monotone functions everyone of which is constructed directly according to the mismatch error without inverting the latter, the difference between the two monotone functions being equal to the function of V, i.e., $$V = V_+ - V_-,$$

where $V_+$ and $V_-$ are the components of the function V.

Then, the expression $$U_+ = \sum_{i=1}^{m} V(\varphi_{2i}) + \sum_{i=1}^{q} V(\mathcal{E}_{3i}),$$

which is a part of the auxiliary function of U can also be presented by its components $U_+$ and $U_-$ to be determined from the formulae:

$$U_+ = \sum_{i=1}^{m} V_+(\varphi_{2i}) + \sum_{i=1}^{q} V_+(\mathcal{E}_{3i}),$$

$$U_- = \sum_{i=1}^{m} V_-(\varphi_{2i}) + \sum_{i=1}^{q} V_-(\mathcal{E}_{3i}).$$

The auxiliary function U is found from the expression $$U = U_{1+} - U_{1-} + \eta\phi.$$

In accordance with the above considerations this function will be shaped with the help of two units: the unit 15 for shaping the components $U_{1+}$ and $U_{1-}$ of the auxiliary function and the differential unit 16. The unit 15 of the auxiliary function components transforms every mismatch error according to the laws of $V_+$ and $V_-$ and then adds similar components to one another, while the differential unit 16 shapes the auxiliary function U on the basis of its components $U_{1+}$, $U_{1-}$, $\eta\phi_1$.

The search procedure uses the time derivative of the auxiliary function which is computed in the differentiating unit 17.

FIG. 4 presents a circuit constructing the time derivative of the mismatch function on the basis of mismatch errors and the values of the minimized and maximized function fed to the circuit from external devices. To shape the components of the V function the circuit uses diodes as its major functional elements.

Signals corresponding to the $U_{1+}$ and $U_{1-}$ components of the auxiliary function as a sum of positive ($V_+$) and negative ($V_-$) mismatch errors are produced in the anode and cathode adding assemblies 55 and 54 (FIG. 4) respectively, while the positive ($V_+$) and negative ($V_-$) components of the mismatch errors are shaped with the use of diode networks.

The voltage sources 62 and 63 serve to preset the parameter $\beta$ and are selected to be equal. Currents flowing through the windings 57 and 58 of the transformer 56 are proportional to the components $U_{1+}$ and $U_{1-}$ of the auxiliary function respectively. In the present circuit the transformer 57 performs two operations simultaneously: it shapes the U auxiliary function on the basis of its components $U_{1+}$, $U_{1-}$, $\eta\phi$ according to the last expression for U and it generates the time derivative of the auxiliary function.

The inputs 51, 52 and 53 of the circuit serve to receive the mismatch errors while the inputs 54 and 65 receive the minimum and the maximum of the function $\phi_i$ respectively. The minimized or the maximized function is added to the mismatch error functions in the windings 59 and 60 of the transformer 57. The signal proportional to the time derivative of the auxiliary functions is produced in the winding 61 of the transformer 56.

The auxiliary function of initial conditions can be constructed on the basis of mismatch errors in the initial conditions represented by currents in way similar to that discussed above, the only difference consisting in that the presetting of initial conditions involves the solution of a system of nonlinear algebraic equations (with a unity matrix) and does not require the minimization or maximization of the function. Hence, the transformer will not have the winding to shape the addend representing the minimized or the maximized function.

The required mode of operation, i.e., the presetting of initial conditions or the search of the problem solution is selected by activating either the channel 5 of initial conditions or the channel 6 of the problem being solved. This is performed by the switch 7 which, according to the mode selection instructions, feeds the input 8 of the output amplifier 9 either with a signal representing the time derivative of the auxiliary function of initial conditions or with a signal representing the time derivative of the auxiliary function of the problem being solved.

The signal of the derivative of the respective auxiliary function is amplified in the amplifier 8 and fed to the analog-to-digital converter 2 which uses it to produce a signal representing the sign of the direvative of the respective function and serving as the input of the digital computing unit 3.

The digital computing unit 3 uses the discrete input signal representing the sign of the derivative of the auxiliary function to generate discrete output signals determining the search direction or to shape, which is the same thing the time derivatives of unknown values. New search directions should be selected according to the behaviours of the auxiliary function when it moves in the previously selected search direction. They should be selected so that the auxiliary function when moving in the given direction would diminish. To take the solution search procedure successful it is required that the search directions should be mutually orthogonal or nearly orthogonal and that their number should coincide with that of unknown variables in the problem being solved.

Operations performed by the digital section of the computer can be divided into two groups. The first group comprises logical operations which produce instructions either to change the search directions for an orthogonal or for a reverse one to the selected direction or to preserve the selected direction, depending upon the behaviour of the function.

The second group of operations involves the execution of instructions generated in the course of operations of the first group. Accordingly, the digital computing unit 3 comprises two sections performing the two groups of operations.

The first group of operations is performed by the automatic search logic device 25 a version of which is shown in the block diagram form in FIG. 2. The inputs 32 and 24 of the automatic search logic device 25 are fed with clock pulses and with a signal representing the sign of the auxiliary function derivative which has the value of +1 when the derivative is positive and the value of 0 when it is negative. Suppose, the signal at the input 24 is at first equal to 0, then, the signal at the outputs 38 and 39 will also be 0, If the signal at the input 24 has changed to 1, the arrival of a clock pulse to the input 32 of the automatic device will produce a 1-signal at the 0-state output 39 of the complementing flip-flop, the 1-signal serving as an instruction for the system to pass over to another search direction, while the output 38 will preserve its 0.

Now, if the signal at the input 24 of the automatic device keeps its value representing 1 until the next clock pulse arrives to the input 32, the arrival of this clock pulse will switch the flip-flop 34 to the initial state in which its 0-output 39 has a signal representing 0 and will make the output 39 of the automatic device produce a signal representing 1 and serving as an instruction to change the sign of advance in the preset direction.

When a signal representing 0 arrives to the input 24 the next clock pulse will drive the circuit to its initial state. Thus, the instruction to pass over to another search direction is determined by the presence of a 1-signal at the output 39 of the automatic device while a 1-signal at the output 38 of the automatic device represents the instruction to reverse the sign of advance in the preset direction.

FIG. 3 shows a version of the automatic device 26 of binary coordinate search directions. At first the instructions to pass over to another coordinate direction and to reverse the search direction are carried out separately by the automatic direction indication sensor 40 and by the automatic device 41 of the sign of advance in the required direction, both devices being arranged as ring counters.

The number of states of the first counter is equal to that of unknown variables, the number of states of the second counter is two. The arrival of an instruction to change the search direction to an orthogonal one drives the automatic direction indication sensor 40 to the successive state. Every state of the sensor 40 corresponds to a search direction code which, having been decoded, makes the circuit 42 for shaping binary coordinate directions generate the respective binary coordinate search direction.

An instruction to reverse the search direction arriving from the output 38 of the search logic automatic device makes the automatic device 41 of the sign of advance change its state. Here, one of the states of the automatic device 41 corresponds to the positive coordinate direction and the other, to the negative one, which is determined by the circuit 42 for shaping binary coordinate search directions.

The search trajectory is shaped by the digital-to-analog converter 4 which uses the search directions determined by the digital computing unit 3 to initiate the advance proper of the search point along the preset directions. The coverter can be arranged around a set of integrators or lineary-varying voltage generators. The varying voltages representing unknown variables produced by the digital-to-analog converter 4 are applied to the input 20 of the analog computing unit.

Thus, the process of solving a problem in the computer involves a continuous variation of unknown variables in time and space along orthogonal directions shaped in a successive way by the digital computing unit. It should be noted that the operation of computer units described above ensures that the unknown variables vary only along those directions for which the value of the auxiliary function, obtained in the analog computing unit 1 according to the problem conditions or to the equations of initial conditions, which depends on the mode of operation of the computer, will diminish. This is manifested by a 0-signal at the input of the digital computing unit 3.

If in the course of variations of unknown variables in this or that direction the value of the respective auxiliary function stops diminishing, i.e., if the input of the digital computing unit 3 receives a 1-signal, the system will start to pass over successively from one search direction to another, the procedure being determined by the search logic as realized in the automatic search logic device 25 of the digital computing unit 3. This process will continue until a direction is found along which the variation of unknown variables results in a further decrease of the value of the auxiliary function.

The decrease of the auxiliary function goes on in the computer almost incessantly since new directions are found quite quickly.

Due to this procedure of varying the unknown variables they soon reach the values corresponding to the minimum of the auxiliary function, i.e., the values of the variables obtained in this way are the root of the problem being solved. If the search in the zone of the auxiliary function minimum is continued it will result in fluctuations of the values of the variables along the said directions within this zone. This will be accompanied by the process of almost continuous transition from one search direction to another with but an insignificant advance along each of them, since variations of variables along any of the directions can produce only short decreases of the auxiliary function.

The range of variable fluctuations about the values corresponding to the minimum of the auxiliary function depends mainly upon the inertia of the computer units, the rate of variable measurements and the frequency of clock pulses fed to the input of the search logic automatic device of the digital computing unit. The inertia can be made sufficiently small by properly selecting these parameters.

The search procedure described above makes it possible to find that minimum of the auxiliary function, the zone of attraction of which has contained the initial point of the search.

A problem having a number of solutions will have an auxiliary function with several minima. To find them it is necessary to repeat the search procedure starting every time from an initial point located in the attraction zone of everyone of the minima.

Consider an example of the computer operation envolving the finding of roots of a system of transcendental equations $$(X_1)^2 + (X_2)^2 - 0.64 = 0$$

$$\cos \pi X_1 - X_2 = 0$$

The voltage representing each variable can vary in the computer from $+U_o$ to $-U_o$ which corresponds to fluctuations of every variable within the range from $+1$ to $-1$. Hence, the zone of the allowable fluctuations of the variables in the computer is represented by an $n$-dimension unity cube, where $n$ is the number of unknown variables in the problem being solved.

Evidently, the computer can find only these roots of the problem which are located within the boundaries of the n-dimension unity cube. Otherwise it would be necessary, by means of shifting the origin of the coordinates of the problem being solved and introducing respective scale factors for unknown variables, to transform the conditions of the problem so that the expected zone of the required root or roots of the problem would be located within the above mentioned unity cube.

As to the problem under consideration which comprises two unknown variables, the zone of the allowable fluctuations of the latter forms a square the apexes of which have the following coordinates: 1,1; 1,−1; −1,−1; −1,1. The conditions of the problems indicate that the latter consists in finding the points where a circle with the radius of 0.8 (the first equation) crosses the cosinusoid (the second equation) which assumes the values: −1 with $X_1 = +1$ or −1; 1 with $X_1 = 0$, 0 with $X_1 = +0.5$ or −0.5. The curves cross each other in four points, i.e., the problem has four solutions. All solutions are located within the zone of allowable fluctuations of the variables and can be obtained on the computer without resorting to problem transformations.

The analog model realizing the present system of equations is shwon in FIG. 15. Passive computing units 163, 164 and 165 realize the relationships of $X^2$ and $aX$ and represent the analog model of the first equation of the system. The inputs of the units are fed with variables $X_1$ and $X_2$ shown in the figure and a voltage $−U_o$ which corresponds to −1.0. The value of the factor $a$ is preset in the unit 165 as 0.64.

In accordance with the values of input variables an output 166 of the model produces the current value of the mismatch error in the first equation. Passive computing units 167 and 168 realizing the relationships of $\cos \pi X$ and X and receiving at their inputs the variables $X_1$ and $X_2$ from an analog model of the second equation. Its output 169 produces the current value $\epsilon_2$ of the mismatch error in the second equation. Passive computing units 170 and 171 realizing the relationships of $x$ and a DC amplifier 172 invert the variable $x$ applied to an input 173 of the unit 170. The inverted value of the variable $X_1$ is generated at an output 174 of the DC amplifier 172 in the form of a voltage. Passive computing units 175 and 176 realizing the relationships of X and a DC amplifier 177 use the value of a variable fed to an input 179 of the unit 175 to produce an inverted value of the variable $X_2$, such as at an output 178.

The use of operational amplifiers 172 and 173 makes it possible to describe the process of finding solutions more obviously, since the value of the auxiliary function of the problem conditions determined according to the mismatch errors $\epsilon_1$ and $\epsilon_2$ depends only on the variables $X_1$ and $X_2$ and the auxiliary function can be presented graphically on a plane. The graphical presentation of the auxiliary function of the conditions of the problem is shown in FIG. 16. The values of the function are given as lines of its similar values equal to 0.1; 0.2; 0.3; 0.4 and 0.5. In addition to equal value lines FIG. 16 shows curves 180 and 181 corresponding to the terms of the equations.

It is evident that the system has solutions in points A, B, C and D which correspond to the four minima of the auxiliary function since the values of the mismatch errors $\epsilon_1$ and $\epsilon_2$ for all solutions are zero while the value of the parameter $\beta$ in the law of transforming the mismatch errors is small enough and the value of the auxiliary function in the points of its minima can be considered zero.

FIG. 16 shows also that the auxiliary function has "knees" in the curves corresponding to the problem equations the radii of which are determined by the value of the parameter $\beta$ in the mismatch transformation law. Consider the search procedure in the computer in case the initial search point is $M_1$.

During the search unknown variables can vary along two mutually orthogonal directions (in accordance with the number of variables) described by binary vectors [1,1]; [1,−1]; [−1,−1]; [−1,1] where the [ ] brackets indicate vectors from which the vectors [1,1]; [−1,−1] and vectors [1,−1], [−1,1] arranged in pairs correspond to opposite and mutually orthogonal directions of search point variations. All four directions are preset by the digital computing unit 3 in the form of the above binary vectors.

The search procedure starts by the presetting, in a random way, of any of the possible directions in which unknown variables can change. Suppose this direction is described by the vector [1,−1]. Since the value of auxiliary function diminishes with the advance in this direction from the $M_1$ point, the time derivative of the auxiliary function will be negative and hence, the output of the analog-to-digital converter 2 will have a 0-signal which will be applied to the input of the automatic search logic device 25 of the digital computing unit 3. This search direction will be preserved until the auxiliary function continues diminishing, i.e., the search point corresponding to the current values of variables will be moving along the line $M_1N$.

When the search point reaches the junction between the line $M_1N$ and a curve 181 of the auxiliary function will start increasing. The time derivative of the auxiliary function will become positive at the output of the analog computing unit 1 and the input of the automatic search logic device 25 will receive a 1-signal. On receiving the following clock pulse from a clock pulse generator 182 (FIG. 2) the output of the automatic search logic device 25 will produce an instruction to switch over to another search direction.

Following this instruction, the automatic direction indication sensor 40, arranged as a ring counter with two states, will switch over to another state and the direction, as set by the vector [1,−1] and presented at the outputs of the automatic device 26 of binary coordinate search directions which serve as the outputs of the digital computing unit 3, will change for a direction as set by the vector [1,1] since the sign of advance in the preset direction has not changed.

Due to the inertia of the computer units and a time gap between the moments when the input of the automatic search logic device is fed with a 1-signal and the next clock pulse, this change of the search direction will take place not at the moment when the search point crosses the curve 181 but a bit later, i.e., when the search point reaches the N point.

In the course of fluctuations of the variables in the new direction along the NP line the auxiliary function will decrease. Hence, the signal at the input of the automatic search logic device 25 changes for 0 and this search direction is preserved. The auxiliary function continues decreasing until the $N^P$ line crosses the curve 180, after which it will start growing.

Therefore, after the search point passes the curve 180 the input of the automatic search logic device 25 will receive a 1-signal, while after the arrival of a clock pulse the direction, as set by the vector [1,1], will again change assuming its former sense. But the advance of the search point in the direction as set by the vector [1,−1] along the PQ line will not produce the decrease of the auxiliary function either, so the 1-signal at the input of the automatic search logic device 25 will be preserved. Therefore, on the arrival of the next clock pulse the automatic search logic device 25 will generate an instruction to change the sign of advance.

Following this instruction, the automatic device 41 of the sign of advance in the required direction arranged as a complementing flip-flop will pass over to another state, while the search direction, as presented at the output of the automatic device 26 of binary coordinate search directions, will change for a direction as set by the vector [−1,1] which is opposite to the former one.

The advance of the search point in this direction, i.e., along the QS line, produced a decrease of the auxiliary function and the 1-signal at the input of the automatic search logic device changes for 0. The search direction will be preserved until the search point passes the junction where the QS line crosses the curve 181, after which the auxiliary function will start growing. In the S point the search direction will change for that preset by the vector [−1,−1] which ensures the further decrease of the auxiliary function. The search advances along the SR line up to a point R where the direction will change for that preset by the vector [−1,1] and then, by the vector [1,−1].

Hence, the search point continues advancing within the minimum zone, the size of which is determined mainly by the inertia of the computer units, the frequency of clock pulses at the input of the automatic search logic device 25, the rate of variations of unknown variables and the shape of the minimum itself (the gentler the slope of the minimum, the greater the zone of advance). The nature of the search point advance in the zone of the minimum is greatly affected by the noise of the computer assemblies and it can be termed as partially random.

A proper choice of the above parameters of the computer units allows to make the fluctuations of unknown vaviables in the minimum zone small enough and to determine the coordinates of the minimum quite precisely.

In case the point has started advancing from the point $M_1$ in the direction as set by the vector [1,1], i.e., along the $M_1N^1$-line the search point will advance via the points $N_2'$, $P'$, $Q'$, $S'$, $R'$ along directions as set by the vectors [1,1]; [1,−1]; [1,1]; [−1,−1]; [−1,1]; [1,−1] respectively.

The search point, therefore, arrives to the zone of the "knee" of the auxiliary function along a curve 181 (point P') and advances further, following the "knee," to the zone of the minimum where it starts oscillating as described above.

By selecting points $M_2$, $M_3$, $M_4$ as the preset initial points of search it is possible to find the coordinates of all minima, i.e., to find all the unknown roots of the problem. It is evident also that there exists quite a number of initial points of search (e.g., a point $M_5$) from which, depending on the first advance direction it is possible to arrive to the zone of various minima, e.g., A and B.

In case a problem has a single solution described by an auxiliary function with a single minimum the search procedure presented above makes it possible to find the minimum irrespective of the coordinates of the initial search point.

This feature of problems having a single solution is used in the computer for presetting the initial search point when solving problems having a number of solutions. The equations of initial conditions instrumented in the analog model 10 have a single solution presented in the form of voltages applied to the inputs 139 of resistors 137 of the analog model. The values of the voltages are preset by the operator. By means of adjusting them the operator can place the solution of the problem, as described by initial conditions, in any point of the zone where the variables are allowed to change in the computer.

The procedure of finding the solution of the initial conditions problem by the computer by means of searching for the minimum of an auxiliary function results in that the variables assume the values that correspond to its minimum, i.e., they can assume any value at the discretion of the operator.

If the computer is switched over to operate in the mode of minimizing the auxiliary function of the problem conditions rather quickly so that the variables would have no time to change considerably, in other words, if, instead of the output of the channel 5 of initial conditions the input of the output amplifier 9 is connected to the output of the channel 6 of the problem being solved, i.e., if the computer is switched over to the search mode of operation, then, due to the fact that the variables are fed simultaneously to the inputs of both channels 5 and 6, the initial point of search for the minimum of the auxiliary function of the problem being solved will be the point of the minimum of the auxiliary function of initial conditions whose coordinates have been preset by the operator when introducing the initial conditions.

Returning again to the mode of presetting initial conditions the operator can introduce another initial search point and repeat the search of the minimum of the auxiliary function starting from this new point. By repeating the search procedure from the various initial points the operator finds various roots of the problem being solved.

Finally it should be noted that the proposed hybrid computer makes it possible to efficiently solve a broad range of problems frequently encountered in practical, e.g., the minimization or maximization of a function of one or several variables, solution of systems of equations and inequalities, as well as problems representing their various combinations. Quite a number of other problems belongs to or can be reduced to those listed above: finding the roots of systems of nonlinear algebraic or transcendental equations, finding real or complex roots of polymers, solving systems of linear or nonlinear algebraic equations, finding eigenvectors and number of matrices, transforming coordinates, etc.

The use of the proposed computer to solve the above problems, when compared to digital computers, is characterized by the simplifity of the programming procedure due to the fact that all the problems are solved by the computer on the basis of the descent method and that the programme is wired in the machine. Besides, the computer has a high speed of finding the roots of problems being solved since the main part of calculations is performed in the analog mode, and due to the fact that the computer successfully combines analog and digital computing units.

When compared with ordinary analog machines the proposed computer is characterized by a broad range of problems being solved and by a simplified procedure of presetting problem conditions.

Moreover, the solution of a problem on the proposed computer requires a smaller number of DC amplifiers, and it is possible to dispense with them altogether.

When compared with available hybrid computers the proposed machine is characterized by the simplicity of all principal computing units and, in particular, by the simplicity of analog-to-digital and digital-to-analog converters due to a highly successful combination of analog and digital computing units.

The proposed hybrid computer as a whole is a simple and efficient computing device of small size and weight.

What we claim is:

1. A hybrid computer for solving nonlinear programming problems, comprising:
   a. an analog computing unit having inputs, an output and incorporating:
      1. a first channel of initial conditions, for shaping a signal proportional to a time derivative of an auxiliary function of the initial conditions by signals proportional to current values of variables and by preset signals proportional to desired initial values, said first channel having inputs and an output, and including in a series connection:
         i. a first analog model of the initial conditions whose inputs serve for said first channel,
         ii. a first unit for shaping components of the auxiliary function of the initial conditions,
         iii. a first differential unit of the initial conditions, and
         iiii. a first unit for differentiating the auxiliary function of the initial conditions, whose output serves for said first channel;
      2. a second channel of a problem, having inputs combined with said inputs of the first channel and serving also as said inputs of the computing unit, for shaping a signal proportional to a time derivative of an auxiliary function of the problem, by signals proportional to current values of variables and by conditions of the problem, said second channel also having an output, and including in a series connection:
         i. a second analog model of the problem, for introducing therein the conditions of the problem, having inputs serving for said second channel, ii. a second unit for shaping components of the auxiliary function of the problem, iii. a second differential unit of the problem, and iiii. a second unit for differentiating the auxiliary function of the problem, whose output serves for said second channel;

3. a switch whose inputs are connected to said outputs of the first and the second channels, and having an output;

4. an output amplifier whose output serves as said outputs of the computing unit, connected to said output of the switch, to connect an input of said amplifier in a first or initial condition presetting mode: to said output of the first channel, and in a second or finding mode: to said output of the second channel, b. an analog-to-digital converter, having an output, and which is a zero organ connected to said output of the output amplifier to generate a signal proportional to the sign of a time derivative of a respective auxiliary function, c. a digital computing unit having an input and outputs, and including in a series connection:

1. an automatic search logic device having an input serving for said digital computing unit, and which shapes signals on the change of the search direction and sign of advance during a search in the required direction by employing the signal generated by said converter;

2. an automatic device for shaping a series of binary coordinate search directions, and whose outputs serve for said digital computing unit, and d. a digital-to-analog converter, employing a set of integrators, with converter outputs being connected to said inputs of the analog computing unit, and with converter inputs being connected to said outputs of the digital computing unit, for producing a continuous search trajectory in accordance with the series of search directions, in the form of signals proportional to current values of variables, which at the end of the search procedure assume the desired initial values, when the computer operates in the first mode; and the value of roots of the programming problems, which corresponds to the values of the initial conditions, when the computer operates in the second mode.

2. The hybrid computer as defined in claim 1, wherein said second analog model includes a generator for the function of at least one variable, whose minimum or maximum is being sought according to the conditions of the problem, said generator having inputs and an output which serve respectively as said inputs and said output of the second analog model, the output value being represented in the form of a current.

3. The hybrid computer as defined in claim 1, wherein said second analog model includes:

a. a passive computing unit having two groups of inputs and outputs;

b. auxiliary function generators having outputs and two groups of inputs, the output values of said passive unit and of said auxiliary generators being represented in the form of currents; and c. a unit of D.C. amplifiers having inputs and outputs, the first groups of inputs of said passive unit and of said auxiliary generators being combined to serve as said inputs of the second analog model, the second groups of said inputs being combined and connected to said output of the unit of D.C. amplifiers, while said output of the auxiliary generators are connected to said inputs of the unit of D.C. amplifiers, and said output of the passive unit serve as said outputs of the second analog model.

4. The hybrid computer as defined in claim 3, wherein said passive unit includes:

a. at least one generator for the functions of at least one variable, involved in the system of inequalities of the problem, said generators having two groups of inputs, with the like groups of said inputs being combined; and b. inequality-to-equation converters having inputs connected to outputs of corresponding ones of said generators, outputs of said converters serving for said passive unit, the output values being represented in the form of currents.

5. The hybrid computer as defined in claim 1, wherein said search logic device includes:

a. three coincidence circuits wherein a first input of each circuit is fed with clock pulses, second inputs of the first and the third coincidence circuits being connected to said output of the analog-to-digital converter, and an output of said third coincidence circuit being said output of the search logic device, which generates a signal for changing the sign of advance during a search in the required direction;

b. an inverter having an input, connected to said output of the analog-to-digital converter, and having an output connected to said second input of the second coincidence circuit; and c. a flip-flop provided with: a complementing input, connected to the output of said first coincidence circuit; a 0-state setting input, also connected to the output of said second coincidence circuit; a 1-state output, connected to a third input of said third coincidence circuit; and a 0-state output, constituting another output of said search logic device, which generates a signal on the change of the search direction.

6. The hybrid computer as defined in claim 1, wherein said device for shaping search directions includes:

a. an automatic direction indication sensor arranged as a ring counter, the number of states of which is equal to that of the unknown variables, and having outputs, said sensor having a complementing input which receives a signal from said search logic device to pass it over to another search direction;

b. an automatic device of the sign of advance in the required direction, arranged as a complementing flip-flop having outputs and an input which latter receives a signal from said search logic device to change the sign of advance in the required direction; and c. a circuit for shaping binary coordinate search directions, arranged as a decoder, and having outputs, inputs and the latter being connected to said outputs of the ring counter and of the flip-flop, while said outputs thereof are said outputs of the device for shaping search directions.

7. The hybrid computer as defined in claim 1, wherein, in order to generate a time derivative of an auxiliary function of the problem described as $$\frac{d}{dt}\left(\eta\varphi_1 + \sum_{i=1}^{S} \sqrt{\mathcal{E}_i^2 + \beta^2}\right),$$

wherein $E_i$ is the mismatch in the equation or inequality of the problem;

$i$ is the number of limitations;

$s$ is the quantity of the limitations in the conditions of the problem;

$\phi_l$ is the function whose maximum or minimum is being sought according to the conditions of the problem;

$\eta$ is a constant assuming the value of either +I or −I depending on whether the minimum or the maximum of the function $\phi_l$ is being sought; and $\beta$ is a constant value, said second shaping unit, said second differential unit and said second differentiating unit are arranged as a common circuit, including:
a. several diode networks, incorporating each two diodes in series and in the same direction, whose junction points serve as the inputs of said common circuit, which inputs are fed with mismatch errors in the equations and inequalities of the problem, like poles of said networks being combined to form cathode and anode adding assemlies respectively;

b. first and second voltage sources having respective negative and positive poles;

c. a transformer having first through fifth windings, with the start of said first winding being connected to said cathode adding assembly while the end of the same winding is connected to said negative pole of the first voltage source; the start of said second winding being connected to said positive pole of the second voltage source while the end of the same winding is connected to said anode adding assembly; the end of said third winding, the start of said fourth winding, and the start of said fifth winding being connected to said positive pole of the first voltage source as well as to said negative pole of the second voltage source and grounded; the start of said third winding and the end of said fourth winding serving as said inputs of the common circuit, which inputs receive signals corresponding to the value of the function whose maximum or minimum is being sought, according to the conditions of the problem; and the end of said fifth winding serving as an output of said common circuit, the signal on said output corresponding to the time variable of the auxiliary function of the problem.

8. The hybrid computer as defined in claim 1, wherein, in order to generage a time derivative of an auxiliary function of the initial conditions described as $$\frac{d}{dt}\sum_{j=1}^{n}(\sqrt{\mathcal{E}_j^2 + \beta^2}),$$

wherein $\epsilon_j$ is the mismatch error in the initial conditions;

$j$ is the number of initial conditions;

$n$ is the quantity of the initial conditions;

$\beta$ is a constant value, said first shaping unit, said first differential unit and said first differentiating unit are arranged as a common circuit, including:
a. several diode networks, incorporating each two diodes in series and in the same direction, whose junction points serve as the inputs of said common circuit, which inputs are fed with mismatch errors in the initial conditions, like poles of said networks being combined to form cathode and anode adding assemblies respectively;

b. first and second voltage sources having respective negative and positive poles;

c. a transformer having first through third windings, with the start of said first winding being connected to said cathode adding assembly while the end of the same winding is connected to said negative pole of the first voltage source; the start of said second winding being connected to said positive pole of the second voltage source while the end of the same winding is connected to said anode adding assembly; and the start of said third winding being connected to said positive pole of the first voltage source as well as to said negative pole of the second voltage source and grounded while the end of the same winding serves as an output of said common circuit, the signal on said output corresponding to the time derivative of the auxiliary function of the initial conditions.

9. The hybrid computer as defined in claim 1, wherein said second analog model includes at least one generator for the functions of at least one variable, forming a system of equations of the problem, said generators having outputs and combined inputs which serve respectively as said inputs and said outputs of the second analog model, the output values being represented in the form of currents.

10. The hybrid computer as defined in claim 1, wherein said second analog model includes:
a. a generator for the function of at least one variable, whose minimum or maximum is being sought according to the conditions of the problem; and
b. at least one further generator for the functions of at least one variable, forming a system of equations of the problem, said generators having combined inputs which serve as said inputs of the second analog model, and said generators also having outputs which serve as said outputs of the second analog model, the output values being represented in the form of currents.

11. The hybrid computer as defined in claim 1, wherein said second analog model includes:
a. said converters having outputs which also serve as said least one variable, involved in the system of inequalities of the problem, said generators having combined inputs which serve as said inputs of the second analog model; and
b. inequality-to-equation converters having inputs connected to outputs of corresponding ones of said generators, said outputs of the generators serving as said outputs of the second analog model, the output values being represented in the form of currents.

12. The hybrid computer as defined in claim 1, wherein said second analog model includes:
  a. a generator for the function of at least one variable, whose minimum or maximum is being sought according to the conditions of the problem;
  b. at least one further generator for the functions of at least one variable, involved in a system of inequalities of the problem; and
  c. inequality-to-equation converters having inputs connected to outputs of corresponding ones of said further generators;
  said generators having combined inputs which serve as said inputs of the second analog model, an output of said firstnamed generator serving as said input of the second analog model, and
  said converters having outputs which also serve as said outputs of the second analog model, all output values being represented in the form of currents.

13. The hybrid computer as defined in claim 1, wherein said second analog model includes:
  a. at least one generator for the function of at least one variable, involved in the system of equations of the problem, said generators having outputs serving as said outputs of the second analog model;
  b. at least one further generator for the functions of at least one variable, involved in the system of inequalities of the problem, said further generators having inputs combined with inputs of said firstnamed generators and serving as said inputs of the second analog model; and
  c. inequality-to-equation converters having inputs connected to outputs of corresponding ones of said further generators; while outputs of said converters also serve as said outputs of the second analog model, all output values being represented in the form of currents.

14. The hybrid computer as defined in claim 1, wherein said second analog model includes:
  a. a first generator for the function of at least one variable, whose minimum or maximum is being sought according to the conditions of the problem, said first generator having output serving as said output of the second analog model;
  b. at least one second generator for the functions of at least one variable, forming a system of equations of the problem, said second generators having outputs also serving as said outputs of the second analog model;
  c. at least one third generator for the functions of at least one variable, involved in the system of inequalities of the problem, said third generators having inputs combined with inputs of said first and of said second generators, said third generators having inputs serving as said inputs of the second analog model; and
  d. inequality-to-equation converters having inputs connected to outputs of corresponding ones of said third generators; outputs of said converters also serving as said outputs of the second analog model, all output values being represented in the form of currents.

15. The hybrid computer as defined in claim 3, wherein said passive unit includes: a generator for the function of at least one variable, whose minimum or maximum is being sought according to the conditions of the problem, said generator having two groups of inputs and an output, the output value being represented in the form of a current.

16. The hybrid computer as defined in claim 3, wherein said passive unit includes: at least one generator for the functions of at least one variable, forming a system of equations of the problem, said generators having two groups of inputs and outputs, with the like groups of said inputs being combined, the output values being represented in the form of currents.

* * * * *